United States Patent [19]
Hirose et al.
[11] 3,976,993
[45] Aug. 24, 1976

[54] GAS DISCHARGE PANEL SELF SHIFT DRIVE SYSTEM AND METHOD OF DRIVING

[75] Inventors: Tadatsugu Hirose; Toshinori Urade, both of Akashi; Hisashi Yamaguchi, Kobe, all of Japan

[73] Assignee: Fujitsu Ltd., Japan

[22] Filed: July 12, 1974

[21] Appl. No.: 488,191

[30] Foreign Application Priority Data

July 16, 1973 Japan ............ 48-80120
July 23, 1973 Japan ............ 48-82855

[52] U.S. Cl. ............ 340/324 M; 315/169 TV
[51] Int. Cl.² ............ G06F 3/14
[58] Field of Search ............ 340/324 M; 315/169 TV

[56] References Cited

UNITED STATES PATENTS 3,775,764 11/1973 Gaur ............ 340/324 M
3,839,713 10/1974 Urade ............ 340/324 M

*Primary Examiner*—Marshall M. Curtis
*Attorney, Agent, or Firm*—Staas & Halsey

[57] ABSTRACT

A gas discharge panel self shift drive system is disclosed in which shift electrodes connected to and energized by voltages supplied to a plurality of shift buses, and electrodes connected to a common bus are disposed to intersect each other at right angles with an ionizable gas filled discharge space being defined therebetween. A shift voltage is applied in succession to the plurality of shift buses to shift a discharge spot. In this system, a high voltage pulse of an erasing level is applied to the common bus; a low voltage pulse is applied to the shift buses; and a sustain voltage which is the sum of the high and low voltages is applied to discharge cells at the intersecting points of the shift electrodes and the common electrodes to sequentially shift the discharge spot.

8 Claims, 13 Drawing Figures

F I G. 2A
PRIOR ART
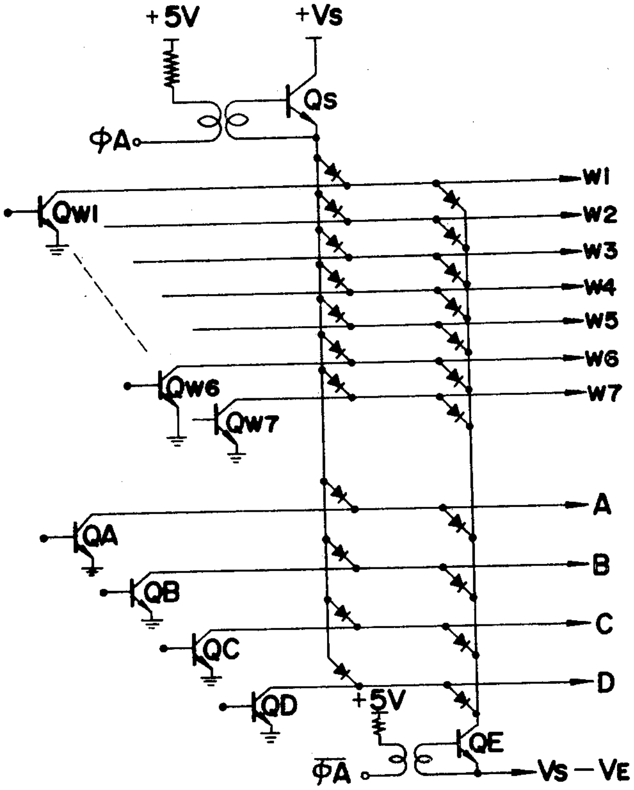
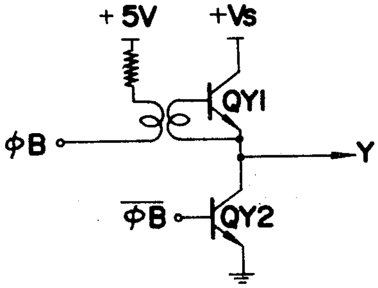
F I G. 2B
PRIOR ART

GAS DISCHARGE PANEL SELF SHIFT DRIVE SYSTEM AND METHOD OF DRIVING

BACKGROUND OF THE INVENTION

1. Field of the Invention

This invention relates to a self shift drive system for a gas discharge panel, especially for an AC driven type gas discharge panel known as a plasma display panel, and more particularly to a self shift drive system therefor, of inexpensive construction.

2. Description of the Prior Art

As is well-known in the art, in a plasma display panel, electrodes covered with dielectric layers, such as of a low-melting-point glass, are disposed in contact with a discharge gas space having sealed therein an ionizable gas such as neon or the like; an alternating sustain voltage is applied between adjacent or opposing ones of the electrodes; and once a discharge is produced by applying a write voltage higher than a firing voltage, the discharge is continuously maintained by the alternating sustain voltage to enable a display by the discharge glow.

Further, there has already been proposed a self shift drive system such that the discharge spot is sequentially shifted by connecting the electrodes to buses energized by multiphase, such as three-phase, ones voltages, or the like, applied to the buses in succession. FIG. 1 is a block diagram showing one example of such a self shift drive system. A plasma display panel 1 comprises common electrodes *y*1 to *y*7 connected to a common bus Y, write electrodes *w*1 to *w*7 disposed opposite to the common electrodes *y*1 to *y*7 to intersect them at right angles and shift electrodes *a*1, *b*1, *c*1, *d*1, *a*2, *b*2, . . . connected to buses A, B, C and D and periodically energized from these buses in the order A, B, C and D. The electrodes are all covered with dielectric layers.

Reference numeral 2 indicates a character generator; 3 and 4 designate shift registers; 5 denotes an oscillator; 6 identifies a frequency divider; 7 represents a phase shifter for shifting the output phase $\phi$A of the oscillator 5 through 180° to $\phi$B; 8 shows each of plural write drivers; 9 and 10 refer to groups of AND circuits; 11 designates each of plural shift drivers for applying a shift voltage to the buses A to D; and 12 identifies a driver for applying a voltage to a common bus Y.

The output from the oscillator 5 is frequency divided by the frequency divider 6 and its frequency divided output drives the shift register 4. Since there are four buses A to D, the shift register 4 is a 4-bit shift register and the output from each of its stages, through a corresponding AND gate 10, drives an associated shift driver 11 and a shift voltage pulse train thereby is sequentially applied to the buses A to D in accordance with a desired shift speed. Further, since the driver 12 is driven by the output from the phase shifter 7, a voltage composed of a pulse train, which is displaced 180° apart in phase from the voltage applied to the buses A to D, is applied to the bus Y.

Upon application of display information to the character generator 2, a write signal is produced in accordance with the output from the shift register 3. In the case of displaying one character with 5×7 dots, a character spacing corresponding to two bits can be provided by implementing the shift register 3, for example, with a 7-bit shift register.

Each write driver 8 is driven in accordance with a write signal derived from the character generator 2 to apply a write voltage to its respective, and thereby, one of the write electrodes *w*1 to *w*7, whereby a discharge spot is produced between the write electrode and the common electrodes *y*1 to *y*7, and the discharge spot is sequentially shifted to the right by switching of the shift voltage applied to the buses A to D.

FIG. 2A is a diagram illustrating the principal parts of the aforesaid drivers 8 and 11, and FIG. 2B illustrates the driver 12; FIGS. 3A and 3B illustrate waveform diagrams for explaining their operations. A transistor QS is turned on at the time of the output $\phi$A and transistors QA to QD, comprising the shift drivers, are turned on at the time of an output $\overline{\phi A}$ from the oscillator 5 only while outputs from the stages of the shift register 4 corresponding to them exist. Further, a transistor QE is turned on by the output $\overline{\phi A}$ from the oscillator 5 and a transistor QY1 connected to the bus Y and a transistor QY2 are turned on by outputs $\phi$B and $\overline{\phi B}$ from the phase shifter 7, respectively. Voltages $V_s$ and $V_E$ bear such a relation that $V_s > V_E$, and the voltage $V_E$ is selected at an erasing level.

Consequently, the write electrodes *w*1 to *w*7 are supplied with a voltage VW shown in FIG. 3A and the buses A to D and Y are supplied with voltages VA to VD and VY, respectively. Namely, in the period from an instant $t_1$ to $t_3$ during which the output from a first stage of the shift register 4 corresponding to the bus A is "1", the transistor QA is driven at the timing of the output $\overline{\phi A}$ from the oscillator 5 to apply a pulse voltage 0 to $+V_s$ to the bus A. In the following period from the instant $t_3$ to $t_4$, that is, while a similar shift pulse voltage is applied to the other buses, the output from the first stage of the shift register 4 is "0", so that the transistor QA is held in its off state, during which, however, a voltage $+V_E$ to $+V_s$ is applied to the bus A by the transistor QE which is turned on and off by the output $\overline{\phi A}$ from the oscillator 5. The level at this time is an erasing level. In a similar manner, the other buses B to D are also supplied with pulse voltages indicated by VB to VD, respectively, and the shift pulse voltages applied to the buses A to D sequentially overlap in time corresponding to the period from the instant $t_2$ to $t_3$.

While the transistors QA to QD making up the shift driver 11 are sequentially driven by the output from the shift register as described above, if a discharge spot is produced in a certain discharge cell, a discharge cell immediately subsequent thereto, which is impressed with the voltage 0 to $+V_s$, is supplied with ions, electrons and metastable atoms from the discharge spot in the preceding discharge cell to produce a discharge spot therein at the voltage $V_s$ and, on the other hand, the preceding discharge cell is automatically supplied with a voltage of the erasing level by the reduction of the output from the shift register 4 corresponding to this cell to "0", so that the discharge is stopped and a wall voltage produced by the discharge is also extinguished. Thus, the preceding discharge cell is cleared before the application of the shift voltage of the next period and made ready for receiving new information.

FIG. 3B shows, on enlarged scale, one part of each of the voltages VB and VY. A voltage indicated by VCL is applied to a discharge cell formed between the shift electrode connected to the bus B and the common electrode connected to the bus Y. For example, in the case of a sustain voltage having a peak voltage 330V, the voltage $V_s$ is 165V and the voltage $V_E$ is 60V and each transistor is required to have a withstand voltage higher than 165V. Further, it is necessary that each voltage has a relatively high frequency of about several hundred KHz and that its rise is sharp. Transistors of such high withstand voltage and high-speed operation are expensive and inevitably increase the cost of the drive circuit of the plasma display panel. Further, high-speed shifting requires application of the voltage $V_2$-$V_E$ of the erasing level by the transistor QE for positively erasing the wall voltage remaining in the discharge cell after shifting, as shown, for example, in FIG. 2, and also necessitates the provision of the transistor QE for that purpose.

SUMMARY OF THE INVENTION

One object of this invention is to provide a novel self shift drive system for gas discharge panels which is free from the aforesaid defects of the prior art, permits fabrication of a driving circuit at low cost and ensures application of an erasing voltage, even if a transistor for applying the voltage of an erasing level is omitted.

Briefly stated, the self shift drive system for gas discharge panels according to this invention comprises a plurality of shift buses having connected thereto shift electrodes, periodically and sequentially energized, and a bus having connected thereto common electrodes disposed oppositely to the shift electrodes to intersect them at right angles. The common bus is supplied with voltage pulses of a level high enough to produce a discharge for erasing a wall voltage produced on the wall of a dielectric layer covering the electrodes; a voltage pulse of low level, which is sequentially applied to the shift buses; and a sustain voltage comprising a combination of the low voltage and the high voltage levels which is applied to discharge cells formed between the shift electrodes and the common electrodes to thereby sequentially shift a discharge spot produced in each discharge cell. Further, transistors of low-speed operation are connected to respectively corresponding ones of the shift buses; common transistors of high-speed operation for voltage application and for grounding are connected to the transistors of low-speed operation; the transistors of high-speed operation are turned on and off with a predetermined pulse period; and the transistors of low-speed operation are held in their on state in the period of application of a shift voltage.

Other objects, features and advantages of this invention will become more apparent from the following description taken in conjunction with the accompanying drawings.

BRIEF DESCRIPTION OF THE DRAWINGS

FIGS. 2A and 2B are circuit diagrams illustrating the principal part of a shift driver heretofore employed;

DESCRIPTION OF THE PREFERRED EMBODIMENTS

Figure 1:
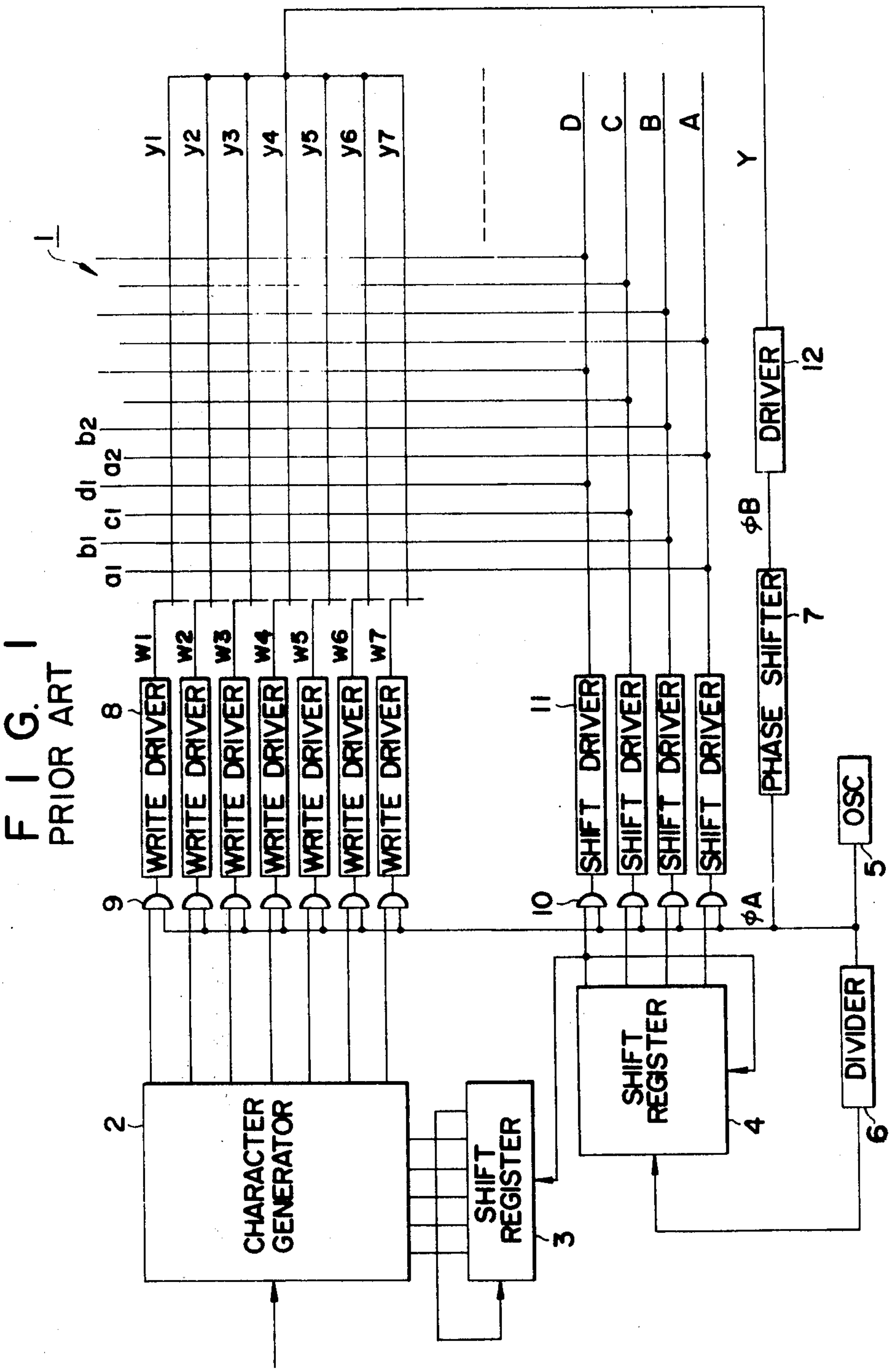
FIG. 1 PRIOR ART
FIG. 1 is a block diagram showing one prior example of a self shift drive system for a plasma display panel.
Figure 4A:
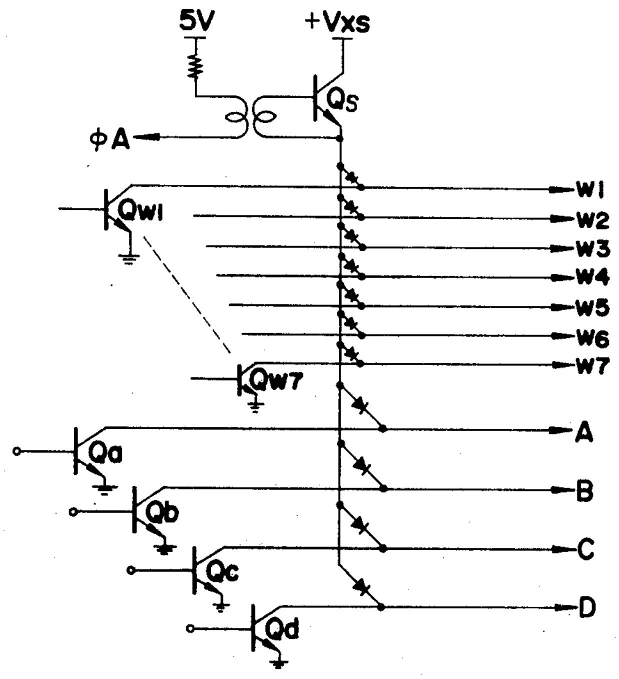
FIGS. 4A and 4B are circuit diagrams showing the principal part of a shift driver in accordance with one example of this invention.
Figure 4B:
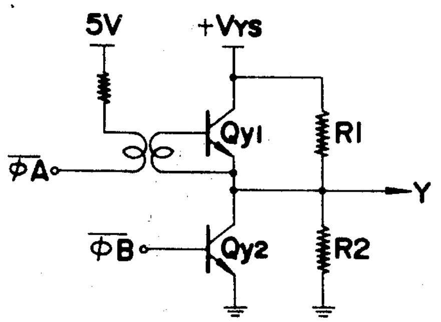
Figure 5:
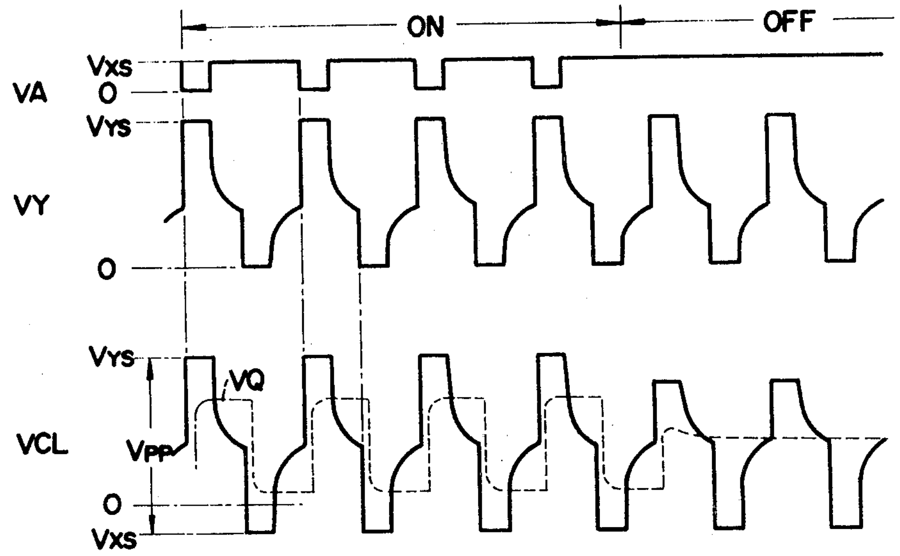
FIG. 5 is a waveform diagram, for explaining its operation.

FIG. 4A illustrates a circuit for implementing the principal parts of write drivers 8 and shift drivers 11 and FIG. 4B similarly shows a circuit for driver 12 (as in FIG. 1) in accordance with one example of this invention. FIG. 5 shows voltages VA, VY and VCL which are applied to a bus A for shifting a discharge spot, a common bus Y and discharge cells, respectively. A transistor QS in FIG. 4A is turned on at the timing of an output $\phi$A derived from an oscillator 5 to apply a voltage +Vxs to write electrodes *w*1 to *w*7 and buses A to D for use in discharge spot shifting. Transistors Qw1 to Qw7 are turned on in accordance with a write signal and transistors Qa to Qd are turned on in accordance with the output from a shift register 4.

A transistor Qy1 of the driver 12 in FIG. 4B is turned on with an output $\overline{\phi A}$ from the oscillator 5 to apply a voltage +Vys to the common bus Y and a transistor Qy2 is turned on with an output $\overline{\phi B}$ from a phase shifter which is phase shifted 180° apart from the output $\phi$A, making the bus Y equipotential to the ground. In the time interval of the outputs $\phi$A and $\phi$B, the potential of the bus Y has a value that is voltage divided by resistors R1 and R2.

Figure 3B:
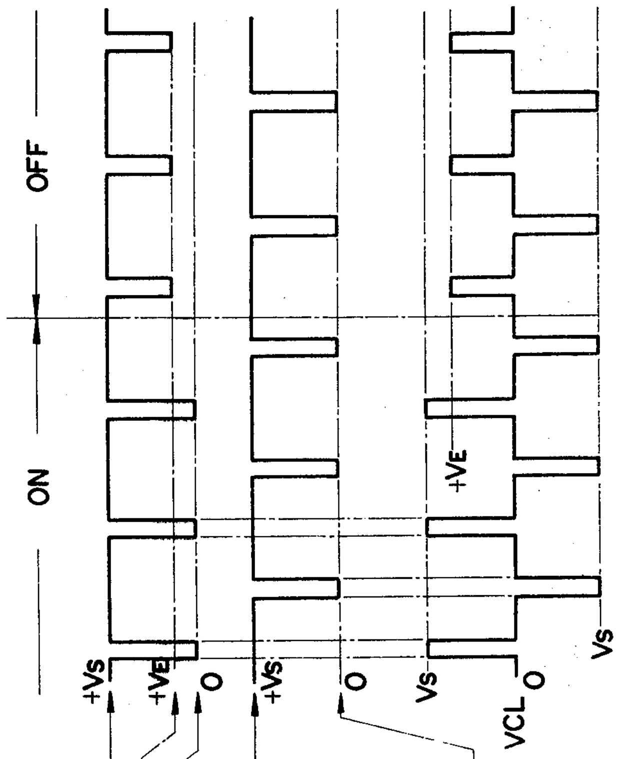
FIGS. 3A and 3B are waveform diagrams, for explaining its operation.

The aforementioned voltages +Vxs and +Vys bear such a relation that Vxs < Vys. A peak voltage Vpp of the voltage VCL applied to the discharge cells, which is a sustain voltage, is Vxs+Vys and selected to be substantially equal to a peak voltage 2Vs shown in FIG. 3B. For example, in the case where the peak voltage Vpp is required to be 330V at the time of shifting a discharge spot, that is, in the ON state period, the voltages +Vxs and +Vys are selected to be 60V and 270V, respectively. Consequently, the transistors QS, Qw1 to Qw7 and Q*a* to Q*d* may be those of low withstand voltage. On the other hand, the transistors Qy1 and Qy2 must be those of high withstand voltage but the number of the transistors Qy1 and Qy2 is small, so that, by forming the larger number of transistors with inexpensive transistors of low withstand voltage, the cost of the circuit can be reduced.

When the transistors Qy1 and Qy2, which are driven by the outputs $\overline{\phi A}$ and $\overline{\phi B}$, are not turned on due to the resistors R1 and R2, a potential of about Vys/2 is applied to a discharge cell and if a discharge spot is produced in the discharge cell, its wall voltage is such as indicated by $V_Q$ in FIG. 5. In the ON state period, the difference voltage between the wall voltage $V_Q$ and the impressed voltage is large and a discharge spot is produced. In the OFF state period, the voltage applied to the discharge cell becomes a voltage on the side of the Y electrodes which is selected to be of an erasing level and an erasing discharge is produced, by which a wall charge is extinguished as shown. Namely, even if any erasing pulse is applied, the voltage of the erasing level is automatically applied to the discharge cell by the pulse-shaped high voltage applied to the bus Y in the OFF state period.

In the case of driving a plurality of such plasma display panels as described above, shift drivers must be each provided for each panel indpendently of the others. However, since the common electrodes can be driven by a driver common to the respective panels, that is, the transistors Qy1 and Qy2, the number of the inexpensive transistors of low withstand voltage is larger than that of the expensive transistors of high withstand voltage and the transistors of high withstand voltage exert less influence on the overall cost of the circuit as compared with those in the prior art, which leads to the reduction of the manufacturing cost of the circuit.

Figure 6:
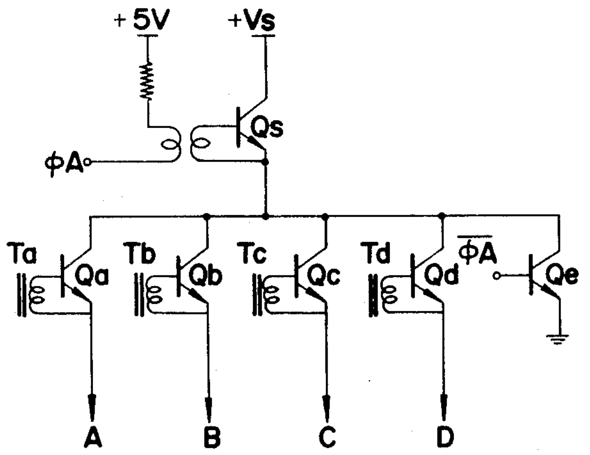
FIG. 6 is a circuit diagram illustrating the principal part of a shift driver in accordance with another example of this invention.

FIG. 6 is a circuit diagram showing the principal part of another example of this invention. Reference characters Q*s* and Q*e* designate transistors of high-speed operation; Q*a* to Q*d* denote transistors of low-speed operation; and T*a* to T*d* represent low-frequency pulse transformers. The transistors of low-speed operation Q*a* to Q*d* are respectively connected to buses A to D for use in discharge spot shifting, similar to those shown in FIG. 1 and are turned on through the low-frequency pulse transformers T*a* to T*d* in the period of application of a pulse voltage for discharge spot shifting use.

Figure 7:
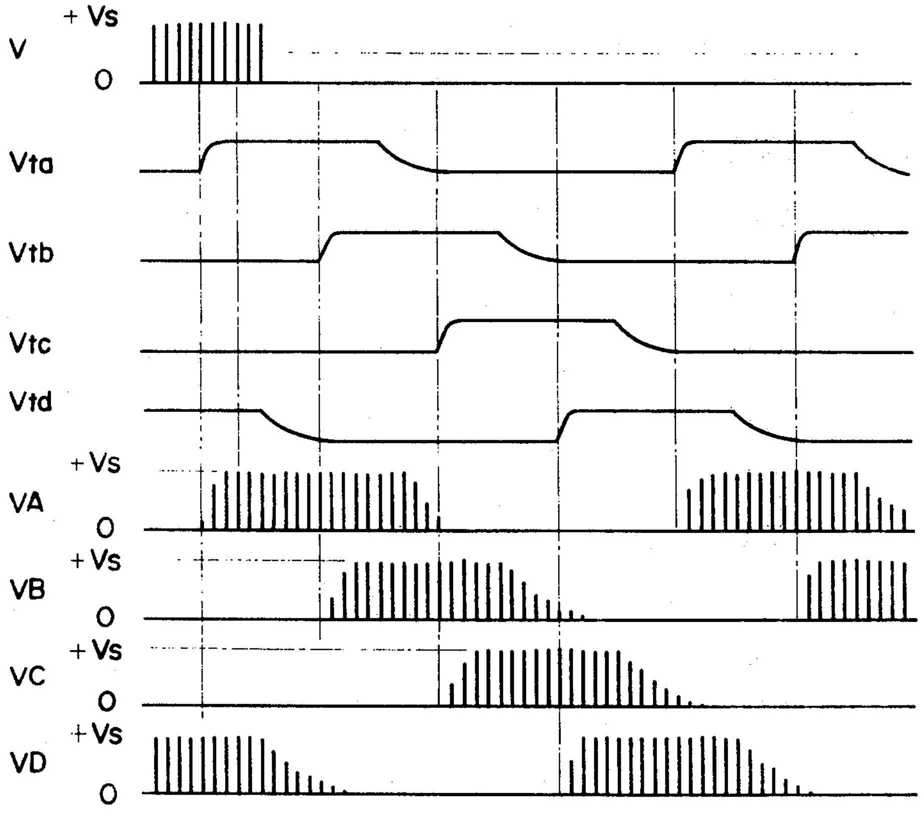
FIG. 7 is a waveform diagram, for explaining its operation.

The transistors of high-speed operation Q*s* and Q*e* are connected to the transistors of low-speed operation Q*a* to Q*d* in common thereto and turned on by pulses $\phi A$ and $\overline{\phi A}$. Accordingly, potentials +Vs and 0 are produced at the common connection point in accordance with the periods of the pulse $\phi A$ and, if the electrostatic capacitance of the common connection point is assumed to be zero, such a pulse voltage as indicated by V in FIG. 7 is applied to the common connection point.

Figure 3A:
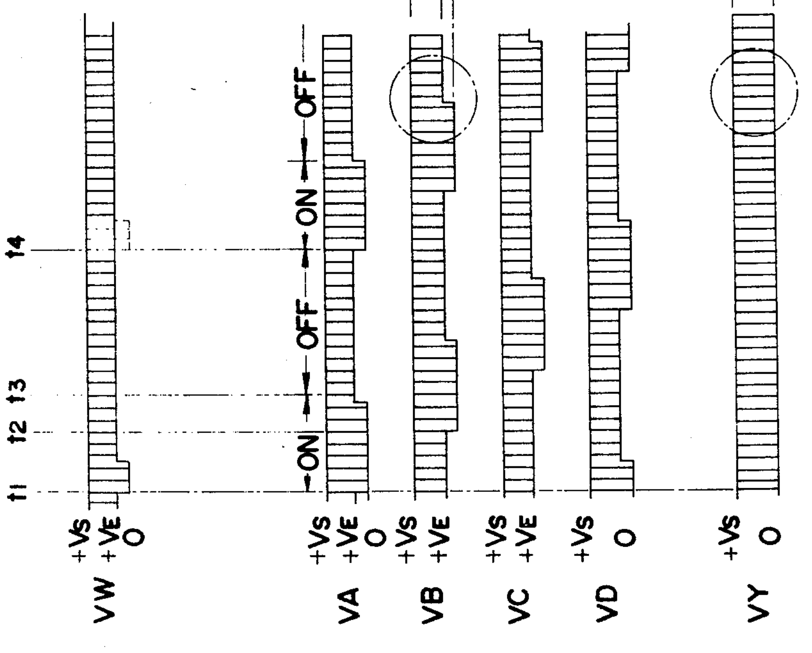

Further, the characteristics of the low-frequency pulse transformers T*a* to T*d* need always be sharp in rise and in fall. Assuming that their output voltages are such as indicated by V*ta* to V*td* in FIG. 7, the transistors of low-speed operation Q*a* to Q*d* are turned on thereby and the output voltages from these transistors, that is, voltages to be applied to the buses A to D become such as indicated by VA to VD in FIG. 7. When the transistor Q*e* is in its on state, the buses A to D are made equipotential to the ground through the low-frequency pulse transformers T*a* to T*d* and the bases and collectors of the transistors of low-speed operation Q*a* to Q*d*. By the combination of the voltages VA to VD with the voltage VY shown in FIG. 3, the discharge cell is supplied with the voltage indicated by VCL in FIG. 3A.

As described above, it is sufficient to turn on the transistors of low-speed operation Q*a* to Q*d* only for the period of application of the shift pulse voltage and their rise and fall characteristics need not be sharp, so that inexpensive transistors can be employed. Further, since their fall characteristics are gentle, the peak values of their output pulses are gradually lowered as indicated by VA to VD in FIG. 7 and they serve as erasing pulses. This provides an advantage that no erasing circuit is necessary.

Figure 8:
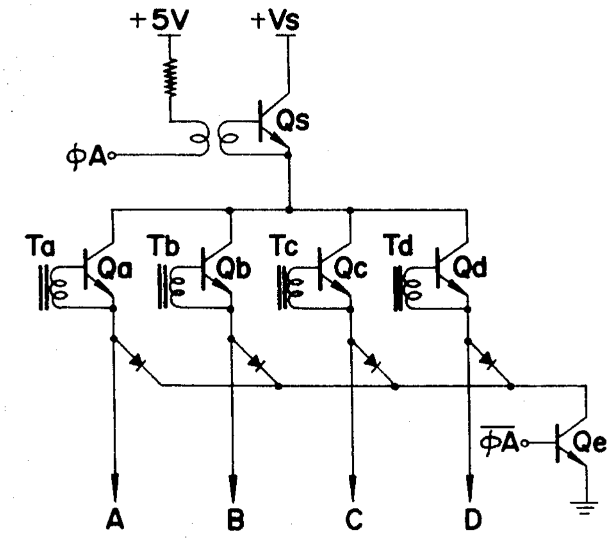
FIGS. 8, 9 and 10, inclusive, are circuit diagrams showing the principal parts of shift drivers in accordance with other examples of this invention, respectively.

FIG. 8 illustrates another example of this invention in which the grounding transistor of high-speed operation Q*e* used in the above example is connected through diodes to the transistors of low-speed operation Q*a* to Q*d* in common thereto and which performs the same operation as the above example.

Figure 9:
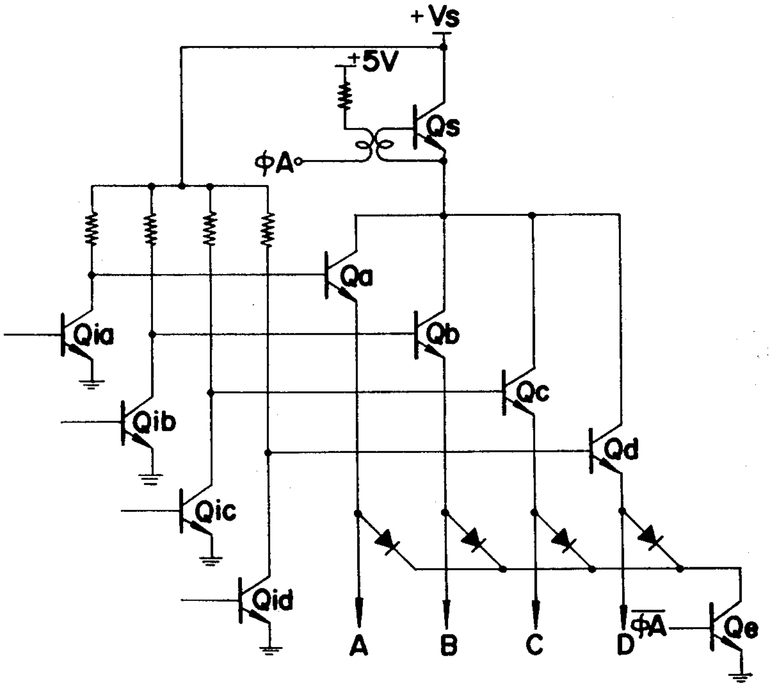

FIG. 9 shows another example of this invention in which transistors of low-speed operation Q*ia* to Q*id* are connected to the bases of transistors Q*a* to Q*d* connected to the buses A to D, respectively. This corresponds to a construction that the low-frequency pulse transformers in the FIGS. 6 and 8 examples are replaced with the transistors of low-speed operation Q*ia* and Q*id*, respectively. The operation of this example is the same as the foregoing examples.

Figure 10:
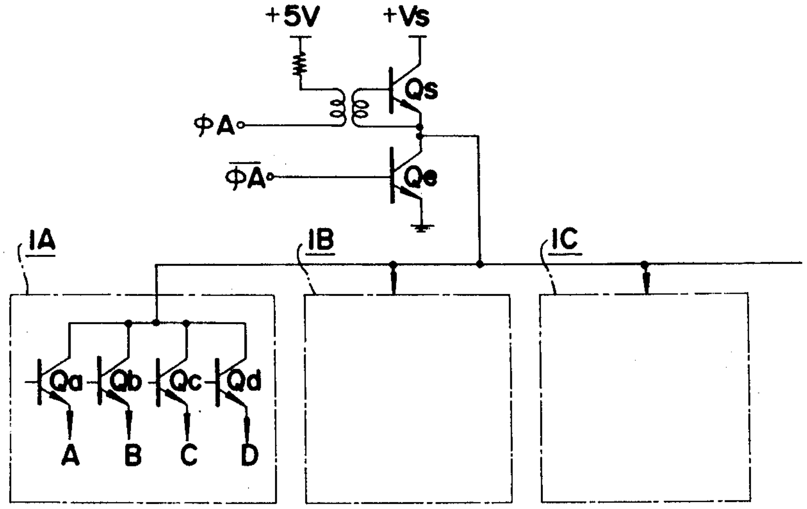

FIG. 10 illustrates another example of this invention in which a plurality of plasma display panels 1A, 1B, . . . are driven in parallel. The plasma display panels 1A, 1B, 1C, . . . are supplied with a pulse voltage by the transistors of high-speed operation Q*s* and Q*e* in common to them and the transistors of low-speed operation Q*a* to Q*d* are connected to the buses A to D of each of the plasma display panels 1A, 1B, 1C, . . . and controlled to be turned on only for the period of application of the discharge spot shifting voltage. Consequently, this circuit employs only two expensive transistors of high-speed operation, Q*s* and Q*e*, for the plurality of plasma display panels 1A, 1B, 1C, . . . , and hence is economical.

Further, in the example of FIG. 4, by controlling the transistors Q*s* and Q*a* to Q*d* as in the examples of FIGS. 6, 8 and 9 and by forming the transistors Q*a* to Q*d* with transistors of low-speed operation, the circuit construction can be made less expensive.

As has been described in the foregoing, in the present invention, a high voltage is applied to the common electrodes and a low voltage is applied to the shift electrodes, so that a shift driver employing many transistors can be formed with transistors of low withstand voltage. Further, even if an erasing pulse is not applied, the voltage applied to the common electrodes becomes of an erasing level, so that the circuit construction can be made at low cost.

Moreover, the transistors of high-speed operation for forming a pulse voltage whose waveform sharply rises and falls are provided in common to the common bus and the shift voltage to be applied to each discharge spot shifting bus is supplied through a transistor of low-speed operation, by which the overall circuit can be made inexpensive as compared with the prior art circuit employing a high-speed operation transistor for each bus. Further, a voltage whose peak value is low due to the gentle fall characteristics of the low-speed operation transistor is applied in the latter period of the shift voltage, and performs the function equivalent to an erasing pulse. This eliminates the necessity of providing an erasing circuit, and hence simplifies the circuit construction.

It will be apparent that many modifications and variations may be effected without departing from the scope of the novel concepts of this invention.

What is claimed is:

1. A self shift drive system for a gas discharge panel having a first plurality of parallel, common electrodes having a common electrical connection thereto and a second plurality of parallel, shift electrodes disposed transversely to said common electrodes, each said plurality being covered by a dielectric layer and said layers being spaced to define a discharge space therebetween, the intersections of said first and second pluralities of electrodes defining respectively corresponding discharge cells, wherein a discharge in any given discharge cell establishes a wall charge on a corresponding portion of the dielectric layer associated with that discharge cell and produces a lowered firing voltage level for establishing a discharge in an adjacent cell, as defined by the next successive shift electrode and the same said common electrode, relatively to the firing voltage level thereof in the absence of any discharge in the said given discharge cell, comprising:

means for applying a voltage pulse of a first predetermined high voltage level to said common electrical connection for supplying correspnding high level voltage pulses in common to said plurality of common electrodes, means for applying in succession to said plurality of parallel shift electrodes, a corresponding succession of low-level voltage pulses, each of a predetermined second voltage level lower in absolute voltage value and of opposite polarity relatively to said high level voltage pulse, and said second voltage level being selected so that when said second, low level voltage pulse is applied to a selected one of said shift electrodes, said second low-level voltage pulse combines with said first high-level voltage pulse applied to said common electrodes to establish in the discharge cells corresponding to said selected shift electrode a voltage level exceeding the said lowered firing voltage, thereby to produce a discharge spot and a wall charge resulting therefrom in each said discharge cell defined by said selected shift electrode discharge cell for which a discharge spot exists in the respectively corresponding discharge cell, and means for automatically erasing a discharge of a given discharge cell in which a discharge was occurring, upon shifting of the discharge spot to a next successive discharge cell, by terminating said low level voltage pulse of said second level applied to the shift electrode associated with said given cell and continuing to apply said high level voltage pulses of said first level, the high level voltage pulses of said first level cooperating with the wall voltage exhibited by said wall charge of said given cell to produce an erasing discharge and maintain thereby a wall voltage having a value such that the impression of a voltage exceeding the normal firing voltage of said discharge cell is cancelled by said high voltage pulse, whereby a discharge spot in a given discharge cell defined between a given shift electrode and a corresponding common electrode is shifted to the next successive discharge cell defined by the next successive, selected shift electrode and the same common electrode by selective application of the successive low level voltage pulse of said second level to the corresponding, next successive shift electrode and is automatically erased from said given discharge cell defined by the said given shift electrode and said same, common electrode by termination of the low level voltage pulse applied to the said given shift electrode.

2. A self shift drive system as recited in claim 1, wherein said means for applying said high voltage level pulse comprises:

a terminal for supplying high voltage to said system and a ground potential terminal, first and second high speed transistors connected for series conduction through a series junction, between said high voltage terminal and a ground potential terminal and first and second resistors connected in series at said series junction between said high voltage terminal and said ground potential terminal and respectively in parallel with said first and second transistors, said common electrical connection of said common electrodes being connected to said series junction, and means for selectively rendering said first transistor conductive to apply high voltage from said high voltage terminal as said high level voltage pulse to said common connection of said common electrodes, and for selectively rendering said second transistor conductive for connecting said common connection of said common electrodes to said ground potential terminal, and, when each of said first and second transistors is non-conductive, said first and second resistors at said series junction provide a voltage equal substantially to one-half of that of said high voltage terminal to said common connection of said common electrodes.

3. A self shift drive system as recited in claim 1, wherein said means for applying a low voltage level shift pulse to said shift electrodes comprises:

a low voltage terminal and a ground potential terminal, a plurality of low speed transistors connected to respectively corresponding ones of said plurality of shift electrodes, a first high speed transistor connected between said low voltage terminal and each of said low speed transistors in common, and a second high speed transistor connected between each of said low speed transistors in common and said ground potential terminal, means for selectively initiating and terminating conduction of said high speed transistors in accordance with a predetermined pulse period, thereby to supply a succession of low voltage pulses in common to said low speed transistors, and means for selectively enabling conduction of said low speed transistors, in succession, to supply the low voltage pulses selectively to said shift electrodes in corresponding succession to the enabling of said low speed transistors.

4. A self shift drive system as recited in claim 3, wherein said means for selectively rendering said low speed transistors conductive comprises a plurality of low-frequency pulse transformers connected to respectively corresponding ones of said plurality of low speed transistors for receiving conduction enabling pulses for rendering the respectively corresponding low-frequency transistors conductive.

5. A self shift drive system as recited in claim 1, for driving a plurality of gas discharge panels and wherein said common electrodes of each said panel are connected to a corresponding said common connection, and said means for applying a high voltage pulse is connected in common to all of said common connections and thus to all of said common electrodes of all of said plurality of panels, thereby to supply said high voltage pulse in common to said common electrodes of all of said plurality of panels.

6. A self shift drive system as recited in claim 1 for driving a plurality of gas discharge panels and wherein said means for applying a shift pulse in sequence to said shift electrodes includes:

a plurality of low speed transistors respectively corresponding to said succession of shift panels, for each said panel, said plural shift electrodes of each said panel being connected to respectively corresponding ones of said low speed transistors for that panel, and high speed transistor means connected in common to said plurality of low speed transistors for each of said panels and to a voltage source of said low voltage level for supplying a shift voltage pulse of said low voltage level in common to said plurality of low speed transistors associated with said shift electrodes of all of said panels.

7. A self shift drive system for a gas discharge panel having a first plurality of parallel, common electrodes having a common electrical connection thereto and a second plurality of parallel, shift electrodes disposed transversely to said common electrodes, each said plurality being covered by a dielectric layer and said layers being spaced to define a discharge space therebetween, the intersections of said first and second pluralities of electrodes defining respectively corresponding discharge cells, wherein a discharge in any given discharge cell establishes a wall charge on a corresponding portion of the dielectric layer associated with that discharge cell and produces a lowered firing voltage level for establishing a discharge in an adjacent cell, as defined by the next successive shift electrode and the same said common electrode, relatively to the firing voltage level thereof in the absence of any discharge in the said given discharge cell, comprising:

a plurality of shift busses connected to respectively corresponding ones of said plurality of shift electrodes of said plurality of panels, a plurality of low speed transistors connected to respectively corresponding ones of said plurality of shift busses, means for selectively enabling conduction of said low speed transistors in succession, corresponding to a succession of shift voltage applying periods for shifting discharges, in succession, to successive ones of the respectively corresponding shift electrodes, high speed transistor means connected in common to said low speed transistors for selectively applying a shift voltage pulse of a second, low voltage level to said low speed transistors and for terminating the application of the shift voltage pulse thereto, a common bus connected to said common electrodes, high speed transistor means for selectively applying a voltage pulse of a first, high voltage level in common to said common electrodes, and said shift voltage pulse of said second level is lower in absolute voltage value and of opposite polarity relatively to said high level voltage pulse, and said second voltage level being selected so that when said second, low level voltage pulse is applied to a selected one of said shift electrodes, said second, low-level, voltage pulse combines with said first, high-level voltage pulse applied to said common electrodes to establish in the discharge cells corresponding to said selected shift electrode a voltage level exceeding the said lowered firing voltage, thereby to produce a discharge spot and a wall charge resulting therefrom in each said discharge cell defined by said selected shift electrode discharge cell for which a discharge spot exists in the respectively corresponding preceding discharge cell, and means for automatically erasing a discharge of a given discharge cell in which a discharge was occurring, upon shifting of the discharge spot to a next successive discharge cell, by terminating said low level voltage pulse of said second level applied to the shift electrode associated with said given cell and continuing to apply said high level voltage pulses of said first level, the high level voltage pulses of said first level cooperating with the wall voltage exhibited by said wall charge of said given cell to produce an erasing discharge and maintain thereby a wall voltage having a value such that the impression of a voltage exceeding the normal firing voltage of said discharge cell is cancelled by said high voltage pulse, whereby a discharge spot in a given discharge cell defined between a given shift electrode and a corresponding common electrode is shifted to the next successive discharge cell defined by the next successive, selected shift electrode and the same common electrode by selective application of the successive low level voltage pulse of said second level to the corresponding, next successive shift electrode and is automatically erased from said given discharge cell defined by the said given shift electrode and said same, common electrode by termination of the low level voltage pulse applied to the said given shift electrode.

8. A method of self-shift driving of a gas discharge panel including a first plurality of parallel, common electrodes having a common electrical connection thereto, and a second plurality of parallel, shift electrodes disposed transversely to said common electrodes, each said plurality being covered by a dielectric layer and said layers being spaced to define a discharge space therebetween, the intersections of said first and second pluralities of electrodes defining respectively corresponding discharge cells, wherein a discharge in any given discharge cell establishes a wall charge on a corresponding portion of the dielectric layer associated with that discharge and produces a lowered firing voltage level for establishing a discharge in an adjacent cell, as defined by the next successive shift electrode and the same said common electrode, relatively to the firing voltage level thereof in the absence of any discharge in the said given discharge cell, comprising:

applying a voltage pulse of a first predetermined high voltage level to said common electrical connection for supplying corresponding high level voltage pulses in common to said plurality of electrodes, applying, in succession to said plurality of parallel shift electrodes, a corresponding succession of a low-level voltage pulses of a second, predetermined, low voltage level, said low-level voltage pulse being lower in absolute voltage value and of opposite polarity relatively to said high level voltage pulse, and said second voltage level being selected so that when said second low level voltage pulse is applied to a selected one of said shift electrodes, said second, low-level, voltage pulse combines with said first, high-level voltage pulse applied to said common electrodes to establish in the discharge cells corresponding to said selected shift electrode a voltage level exceeding the said lowered firing voltage, thereby to produce a discharge spot and a wall charge resulting therefrom in each said discharge cell defined by said selected shift electrode for which a discharge spot exists in the respectively corresponding preceding discharge cell, and automatically erasing a discharge of a given discharge cell in which a discharge was occurring, upon shifting of the discharge spot to a next successive discharge cell, by terminating said low level voltage pulse of said second level applied to the shift electrode associated with said given cell and continuing to apply said high voltage pulses of said first level, the high voltage pulses of said first level cooperating with the wall voltage exhibied by said wall charge of said given cell to produce an erasing discharge and maintain thereby a wall voltage having a value such that the impression of a voltage exceeding the normal firing voltage of said discharge cell is cancelled by said high voltage pulse, whereby a discharge spot in a given discharge cell defined between a given shift electrode and a corresponding common electrode is shifted to the next successive discharge cell defined by the next successive, selected shift electrode and the same said common electrode by selective application of the successive low level voltage pulse of said second level to the corresponding, next successive shift electrode and is automatically erased from said given discharge cell defined by the said given shift electrode and said same, common electrode by termination of the low level voltage pulse applied to the said given shift electrode.

* * * * *

UNITED STATES PATENT AND TRADEMARK OFFICE

CERTIFICATE OF CORRECTION

PATENT NO. : 3,976,993

DATED : August 24, 1976

INVENTOR(S) : Tadatsugu Hirose et al

It is certified that error appears in the above-identified patent and that said Letters Patent are hereby corrected as shown below:

Column 3, line 6, change "$V_2-V_E$" to --$V_s-V_E$ --.

Signed and Sealed this

Twenty-sixth Day of October 1976

[SEAL]

*Attest:*

RUTH C. MASON
*Attesting Officer*

C. MARSHALL DANN
*Commissioner of Patents and Trademarks*